Oct. 31, 1950

R. B. DOME 2,528,214

VISUAL VOLTAGE INDICATOR

Filed Nov. 10, 1948

Inventor:
Robert B. Dome,
by Merton W. Morse
His Attorney.

Patented Oct. 31, 1950

2,528,214

UNITED STATES PATENT OFFICE 2,528,214

VISUAL VOLTAGE INDICATOR

Robert B. Dome, Geddes Township, Onondaga County, N. Y., assignor to General Electric Company, a corporation of New York Application November 10, 1948, Serial No. 59,335

5 Claims. (Cl. 177—311)

This invention relates generally to visual voltage indicators and more particularly to devices of this type which are suitable for use as tuning indicators in phase or frequency modulation receivers.

In frequency or phase modulation receivers, it is necessary to provide fairly accurate tuning if noise balancing and distortionless reception are to be achieved. The exact tuning point required at the receiver is often difficult to estimate, not only by the casual operator but even by those experienced in the art.

The detection circuit of a frequency or phase modulation receiver normally comprises a discriminator which provides an output voltage proportional to the frequency deviation of a carrier wave from a central frequency. If the receiver is properly adjusted and tuned exactly to the frequency of an unmodulated carrier wave, the output of the discriminator will be zero, whereas if the receiver is tuned to a frequency either above or below the center frequency, the discriminator will have a constant positive or negative output voltage. In the past, tuning aids have been employed comprising either a microammeter or a luminescent anode electron discharge device in a circuit connected to the discriminator output to provide an indication. However, these two devices are usually too costly to incorporate in a medium priced receiver.

It is an object of this invention to provide a new visual tuning indicator making use of a simpler and more economical circuit than heretofore available.

Another object of this invention is to provide a visual indicating device for distinguishing signal voltages as being either within a predetermined range of values bounded by a positive and a negative value, or as more positive than the positive value, or as more negative than the negative value.

A further object of this invention is to provide a visual indicating device comprising a pair of gaseous glow discharge devices in which both devices glow through conduction when a voltage applied to a pair of input terminals is substantially zero and one or the other of the devices glows when the voltage applied is positive or negative.

For further additional objects and advantages and for a better understanding of the invention, attention is now directed to the following descriptions and accompanying drawings and also to the appended claims in which the features believed to be novel are particularly pointed out.

Figure 1:
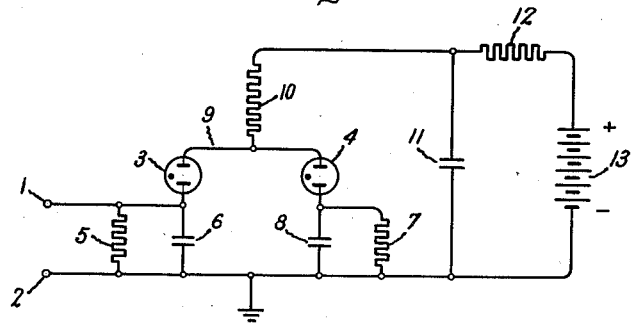
Figure 2:
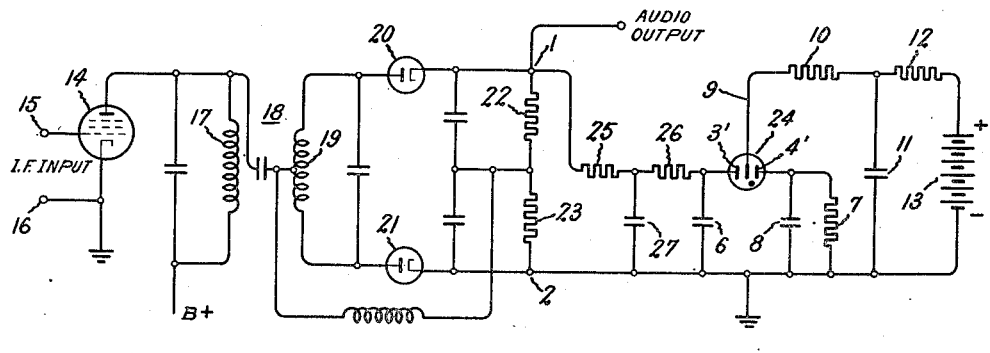

In the drawing, Fig. 1 is a schematic diagram of a voltage indicating device embodying my invention; Fig. 2 is a schematic diagram of a tuning indicator embodying my invention in which the voltage indicator of Fig. 1 has been combined with a discriminator circuit of a typical frequency modulating receiver.

Referring to Fig. 1, there is shown a pair of input terminals 1 and 2 adapted to be supplied with a signal voltage which may be positive, negative, or substantially zero. In accordance with the polarity of the signal voltage supplied, one or the other or both of two gaseous glow discharge devices 3 and 4 will conduct. These devices may for instance consist of two small neon lamps, each having a pair of electrodes. One electrode of device 3 is connected by means of a parallel combination of a resistance 5 and a capacitance 6 to the input terminal 2 which is grounded, and similarly, one electrode of device 4 is connected by a resistance 7 and a capacitance 8 to input terminal 2. The other electrodes of devices 3 and 4 are connected together by means of a conductor 9, and both are connected by means of a resistance 10 to one terminal of a capacitance 11 of which the other terminal is grounded. A resistor 12 connects the junction point of resistance 10 and capacitance 11 to the positive terminal of a battery 13, of which the negative terminal is grounded.

The operation of the circuit is dependent upon the gaseous discharge devices 3 and 4 having striking potentials which are substantially but not exactly equal. As is well known in the art, when a potential is applied across a pair of electrodes in a reduced atmosphere of an inert gas, such as neon, substantially no current flows until the potential applied has increased to a certain value. When this value is attained, the inert gas medium ionizes and a heavy current flows between the electrodes. The potential at which the device passes from a previously nonconducting state to a conducting state is called the striking potential. After the device has begun to conduct, it continues to conduct until the applied potential falls to a value considerably lower than that originally applied to ionize it and initiate the conduction. After conduction has ceased, the applied potential must be raised to the striking potential value before conduction will start again.

Referring now to Fig. 1 and assuming that the capacitance 11 is initially discharged and that the potential developed by battery 13 is greater than the striking potential of either device, capacitance 11 charges through resistance 12 until the potential applied across the gaseous discharge devices is sufficient to cause one of them to strike. In practice, it is impossible to make the characteristics of such a pair of devices identical so that one of the devices will normally strike first. Assuming that device 3 has a slightly lower striking potential than device 4, it begins to conduct and to discharge capacitance 11, while simultaneously charging capacitance 6. Device 3 continues to conduct as long as the difference between the potential remaining across capacitance 11 and that being developed across capacitance 6 is sufficient to maintain conduction. As soon as this difference falls below the required value, device 3 ceases conducting and capacitance 11 begins to recharge through resistance 12, while capacitance 6 slowly discharges through resistance 5. Now when capacitance 11 has charged to the value which has previously been sufficient to cause device 3 to strike, this device does not strike because of the fact that the residual charge remaining across capacitance 6 reduces the actual potential difference between the electrodes. Accordingly, capacitance 11 continues to charge until it reaches the striking potential of device 4 which then ionizes, and proceeds to discharge capacitance 11 and to charge capacitance 8. On the succeeding cycle, device 3 ionizes, because by then, capacitance 6 will have discharged to a much lower value than the value of charge which will be remaining across capacitance 8. Accordingly, the devices 3 and 4 conduct and glow alternately. By proper selection of resistance 12 and capacitance 11, the alternations of conduction between the two devices may be made to occur at a frequency high enough that, through persistence of vision, both devices appear to glow continuously and equally.

If now a positive signal voltage is applied to terminal 1 with respect to terminal 2, a constant bias voltage occurs across capacitance 6. If this positive bias is sufficiently high, device 4 always attains a striking potential before device 3. Accordingly, device 4 ionizes and conducts repeatedly in spite of the charge developed across capacitance 8 as a result of each period of conduction. Device 4 then appears to glow continuously and evenly, whereas device 3 remains extinguished. On the other hand, if a negative signal voltage is applied to terminal 1 with respect to terminal 2, the constant negative bias across capacitance 6 is then of a polarity to increase the total potential difference between the electrodes of device 3. If this signal voltage is sufficiently negative so that, in combination with the voltage developed across capacitance 11, the striking potential of device 3 is always attained before that of device 4, then device 3 conducts repeatedly, whereas device 4 remains nonconducting.

It will be apparent that for devices 3 and 4 to conduct equally when the signal applied to the input terminals is zero, it is necessary that the combination of resistance 5 and capacitance 6 have a time constant equal to that of the combination of the resistance 7 and the capacitance 8. Also, it is necessary that the time constant of both combinations, in addition to being substantially equal, must be long enough with respect to the time constant of resistance 12 and capacitance 11, that some charge remain across either capacitance 6 or capacitance 8 throughout the interval from the moment when one device ceases to conduct, until the moment when the other device would normally begin to conduct. Also, the residual voltage remaining must be greater than the difference in the striking potentials of the two devices. If these conditions are not observed, the device having the lower striking potential will conduct repeatedly, whereas the other device will remain nonconducting when the applied signal voltage is zero.

Also, it will be apparent that a certain minimum signal voltage, either positive or negative, must be applied to the input terminals 1 and 2 before the alternations in conduction between the two devices cease and one device conducts repeatedly. This minimum value of signal voltage is approximately equal to that normally remaining across either capacitance 6 or capacitance 8 after a time when the device to which they are respectively connected has ceased to conduct and the other device is just on the point of striking or ionizing. In the case of the positive voltage required to prevent device 3 from conducting, this voltage must be equal to the voltage remaining across capacitance 6 at the instant just before device 4 ionizes plus the difference in striking potentials between devices 3 and 4. The negative voltage required to cause device 3 to conduct repeatedly and to prevent device 4 from conducting is the voltage just sufficient to maintain the average voltage developed across capacitance 4 equal to zero. Thus, it is seen that there is a small range of voltages centering about zero and extending to a certain positive value and also to a certain negative value, throughout which devices 3 and 4 continue to conduct alternately without being affected by the applied signal voltage. As soon as a positive signal voltage exceeding this positive value is applied, device 4 conducts repeatedly. Conversely, if a negative signal voltage is applied exceeding this negative value, device 3 conducts repeatedly. By proper selection of the parallel combinations of resistance 5 and capacitance 6 and of resistance 7 and capacitance 8, it is possible to reduce this range of values to an extent limited only by the constancy of the striking potentials of the devices.

In a particular construction of a voltage indicator embodying my invention, the following constants for the circuit elements have been found to insure efficient operation:

| Resistances | Capacitances | Discharge Devices |
| --- | --- | --- |
| Megohms<br>5:1<br>7:1<br>10:0.1<br>12:13 | 6:0.05 microfarad<br>8:0.05 microfarad<br>11:0.001-0.01 depending on the alternation rate desired. | 3: neon tube NE-24<br>4: neon tube NE-24.<br><br>*Voltages*<br>13: Battery to develop 250 volts. |

Referring to Fig. 2, I have shown the circuit of Fig. 1 connected to the discriminator circuit of a frequency modulated receiver to provide a visual tuning indicator. The part of a frequency modulated receiver shown comprises an amplifier device 14 having a pair of input terminals 15 and 16 to which an intermediate frequency input is applied. The anode of the device is connected to the primary 17 of a discriminator circuit 18, having a secondary 19 and a pair of diode rectifying valves 20 and 21. The audio output of the discriminator is developed across a pair of resistors 22 and 23.

A pair of points 1 and 2 as shown correspond with the input terminals of the voltage indicator circuit of Fig. 1. In this embodiment devices 3 and 4 have been replaced by a single device 24 comprising a common electrode and a pair of end electrodes 3' and 4'. Device 24 accordingly has two independent conducting paths, the first from the common electrode to electrode 3' and the second from the common electrode to electrode 4'. These individual conducting paths perform the same functions as the single devices 3 and 4 shown in Fig. 1. The remainder of the circuit is identical to that of Fig. 1 except for the combination of resistances and capacitances connecting electrode 3' to ground. The combination comprises discriminator output resistances 22 and 23 and a filtering network comprising resistance 25 and 26 and capacitances 27 and 6. The purpose of this network is to provide filtering of the audio output developed across input points 1 and 2 when the receiver is tuned to a modulated carrier and to permit only a unidirectional voltage to be applied across capacitance 6. This unidirectional voltage is dependent upon the tuning of the receiver to the carrier and not upon the modulation of the carrier.

In operation when the receiver is exactly tuned to a carrier, an alternating voltage may be developed between points 1 and 2, depending upon whether or not the carrier is modulated. However, in either case, no unidirectional component is developed between these points and accordingly no bias voltage is developed across capacitance 6 and both conducting paths of device 24 ionize alternately, causing both halves of the device to glow evenly. When the receiver is tuned to a frequency either above or below the carrier frequency, a unidirectional positive or negative voltage is developed across points 1 and 2. If the former is developed, the left hand conducting path of device 24 becomes extinguished and only the right hand conducting path to electrode 4' glows. If the latter is developed, i. e. a negative voltage, the right hand conducting path is extinguished and only the left hand conducting path to electrode 3' glows. Thus device 24 provides a visual indication of the tuning of the receiver.

While certain specific embodiments have been shown and described, and certain illustrative values have been given, it will, of course, be understood that various modifications may be made without departing from the invention. The appended claims are, therefore, intended to cover any modifications which are within the true spirit and scope of the invention.

What I claim as new and desire to secure by Letters Patent of the United States is:

1. A visual indicating device for distinguishing a signal voltage as being within a predetermined range of values bounded by a positive and a negative value, or as more positive than said positive value or as more negative than said negative value, comprising, a pair of gaseous glow discharge devices having substantially equal striking potentials, each of said devices having a first and a second electrode, a source of substantially constant unidirectional current, a capacitance having a pair of terminals connected across said source, a connection from both said first electrodes to one of said terminals, a pair of parallel combinations of resistance and capacitance having substantially equal time constants connecting each of said second electrodes to the other of said terminals, said signal voltage being applied across one of said combinations whereby both said devices alternately glow through conduction when said signal voltage is within said range, one of said devices glowing when said signal voltage is more positive than said positive value, and the other of said devices glowing when said signal voltage is more negative than said negative value.

2. A visual indicating device for distinguishing a signal voltage as being either within a predetermined range of values bounded by a positive and a negative value, or as more positive than said positive value, or as more negative than said negative value, comprising, a pair of gaseous glow discharge devices having substantially equal striking potentials, each of said devices having a first and second electrode, a source of substantially constant potential, a resistance and a capacitance having a pair of terminals serially connected across said source, said resistance and capacitance having one time constant, a connection from both said first electrodes to one of said terminals, a pair of parallel combinations of resistance and capacitance having substantially equal time constants connecting each of said second electrodes to the other of said terminals, said equal time constants being of the same order of magnitude as said one time constant, said signal voltage being applied across one of said combinations whereby both said devices alternately glow through conduction when said signal voltage is within said range, one of said devices glows when said signal voltage is more positive than said positive value, and the other of said devices glows when said signal voltage is more negative than said negative value.

3. A visual indicating device for distinguishing a signal voltage as being either within a predetermined range of values bounded by a positive and a negative value, or as more positive than said positive value or as more negative than said negative value, comprising a gaseous glow discharge device having a pair of discharge paths between a central electrode and a pair of end electrodes, said discharge paths having equal striking potentials, a source of substantially constant potential greater than said striking potential, a resistance and a capacitance having a pair of terminals serially connected across said source, said resistance and capacitance having one time constant, a connection from said central electrode to one of said terminals, a pair of parallel combinations of resistance and capacitance having substantially equal time constants connecting each of said end electrodes to the other of said terminals, said equal time constants being of the same order of magnitude as said one time constant, said signal voltage being applied across one of said combinations whereby both said discharge paths alternately glow through conduction when said signal voltage is within said range, one of said paths glows when said signal voltage is more positive than said positive value, and the other of said paths glows when said signal voltage is more negative than said negative value.

4. A visual tuning indicator for use with a receiver in which tuning to either side of a carrier frequency causes the generation of a positive or a negative voltage across a discriminator output circuit, whereas exact tuning to said carrier frequency results in no voltage across said circuit, comprising a gaseous glow discharge device having a pair of discharge paths between a central electrode and a pair of end electrodes, said discharge paths having equal striking potentials, a source of substantially constant potential greater than said striking potential, a resistance and a capacitance having a pair of terminals serially connected across said source, said resistance and capacitance together having a charging time constant, a connection from said central electrode to one of said terminals, a pair of parallel combinations of resistance and capacitance connecting each of said end electrodes to the other of said terminals, said discriminator output circuit being connected in parallel with one of said combinations to form a network, said network and the other of said combinations having substantially equal time constants, said equal time constants being of the same order of magnitude as said charging time constant, whereby both said discharge paths alternately glow through conduction when said receiver is tuned to said carrier frequency, and one or the other of said paths glows when said receiver is tuned to either side of said carrier frequency.

5. A visual indicating device for distinguishing a signal voltage as being within a predetermined range of values bounded by a positive and a negative value, or as more positive than said positive value or as more negative than said negative value, comprising, a pair of gaseous discharge paths having equal striking potentials, each of said paths having first and second electrodes at the ends thereof, said first electrodes being connected together, a source of substantially constant unidirectional current, a capacitance having a pair of terminals connected across said source, a connection from both said first electrodes to one of said terminals, a pair of parallel combinations of resistance and capacitance having substantially equal time constants connecting each of said second electrodes to the other of said terminals, said signal voltage being applied across one of said combinations whereby both said paths alternately glow through conduction when said signal voltage is within said range, one of said paths glowing when said signal voltage is more positive than said positive value, and the other of said paths glowing when said signal voltage is more negative than said negative value.

ROBERT B. DOME.

REFERENCES CITED

The following references are of record in the file of this patent:

UNITED STATES PATENTS

| Number | Name | Date |
|---|---|---|
| 2,130,440 | Willis et al. | Sept. 20, 1938 |
| 2,278,516 | Gulliksen | Apr. 7, 1942 |
| 2,367,509 | Knowlton | Jan. 16, 1945 |
| 2,411,848 | Camras | Dec. 3, 1946 |
| 2,438,742 | Farrow | Mar. 30, 1948 |
| 2,470,067 | Callender et al. | May 10, 1949 |
| 2,470,334 | Briggs | May 17, 1949 |